April 26, 1966 P. W. KLOOZ ETAL 3,247,532
TRANSFER MECHANISM
Filed April 27, 1964 6 Sheets-Sheet 1

INVENTORS.
PAUL W. KLOOZ
EDWARD A. KELLY
BY VINCENT A. STIFANO, JR.

Morgan, Finnegan, Durham & Pine
ATTORNEYS

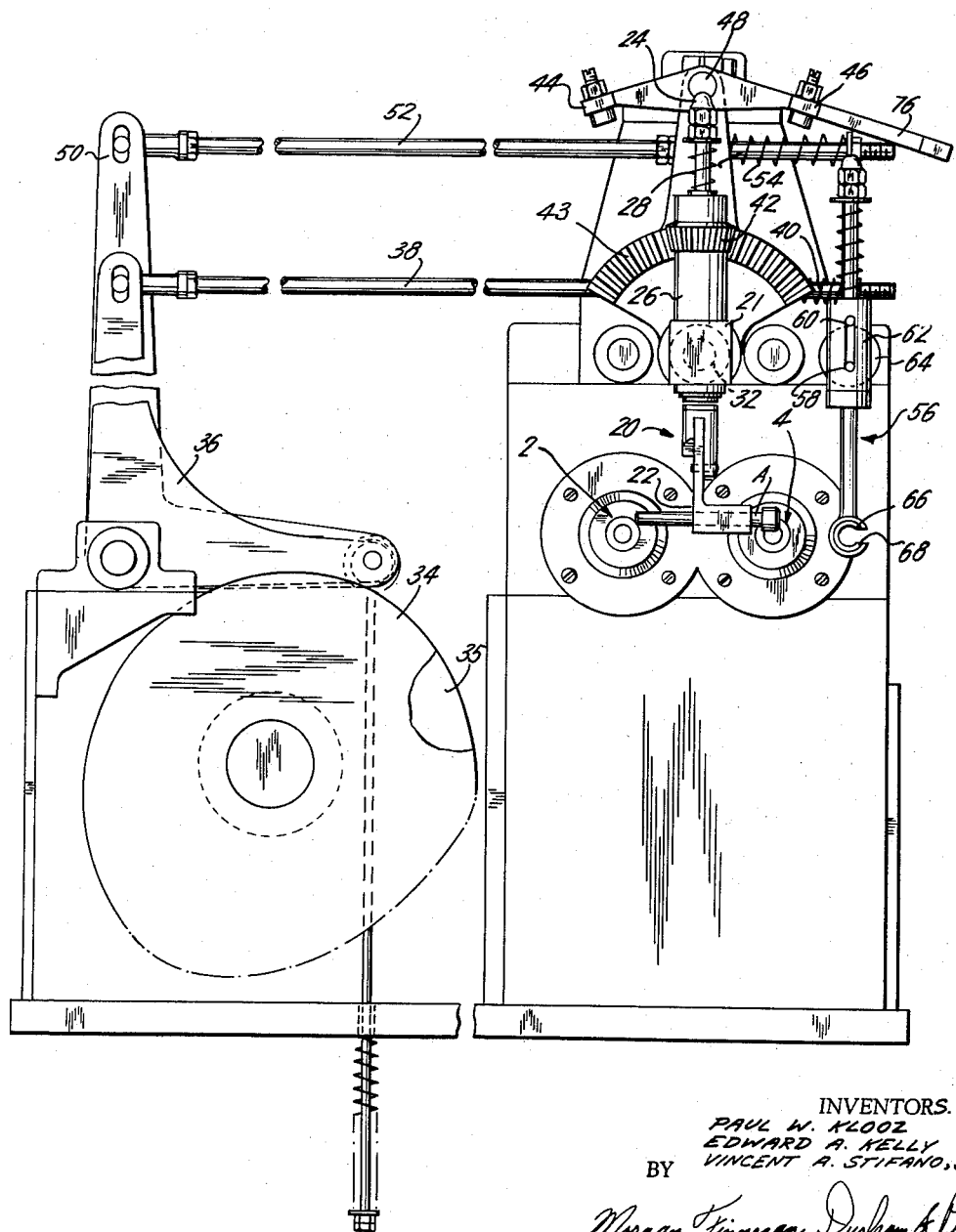
FIG. IB

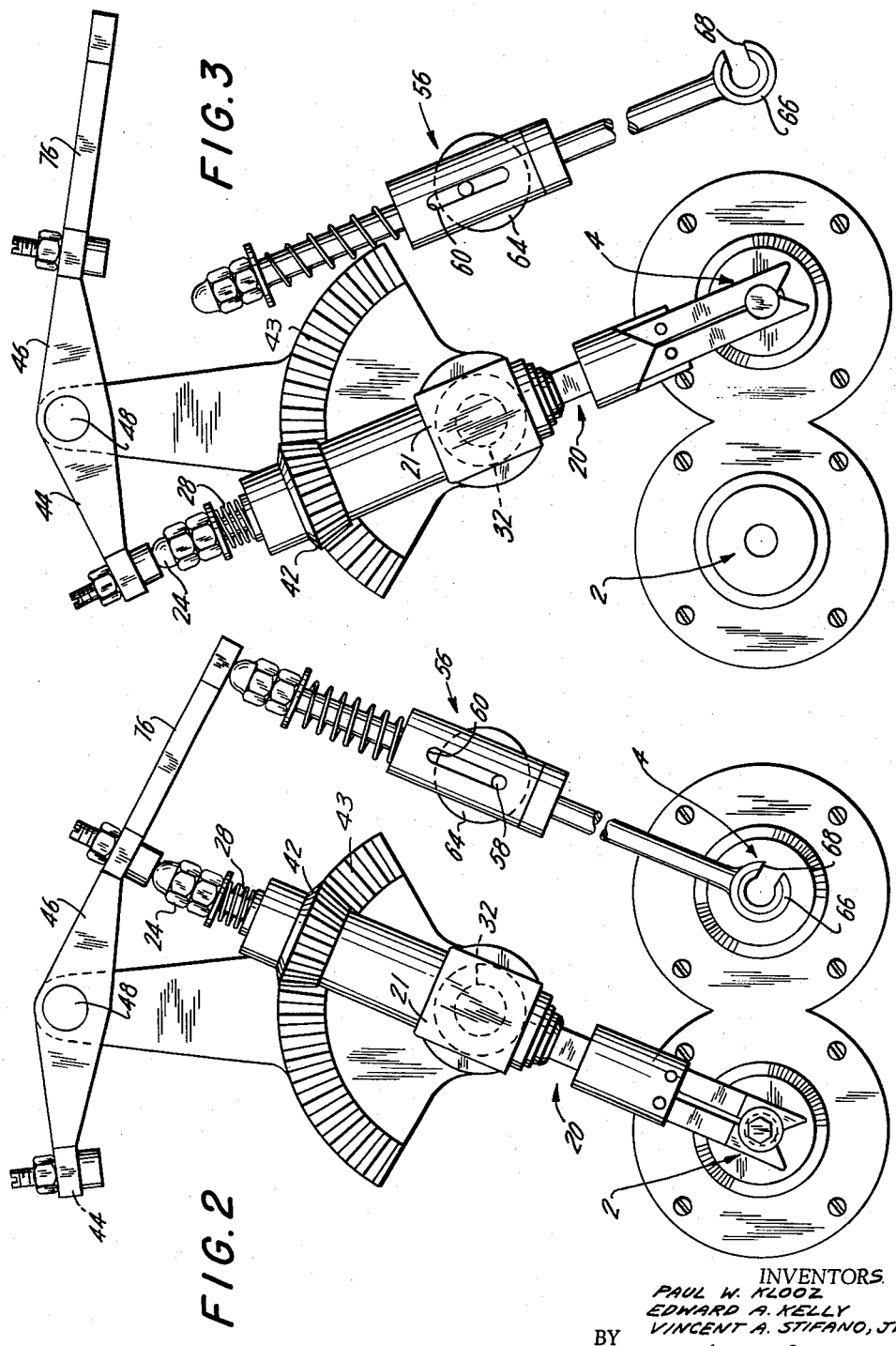

INVENTORS.
PAUL W. KLOOZ
EDWARD A. KELLY
VINCENT A. STIFANO, JR.
BY Morgan, Finnegan, Durham & Pine
ATTORNEYS

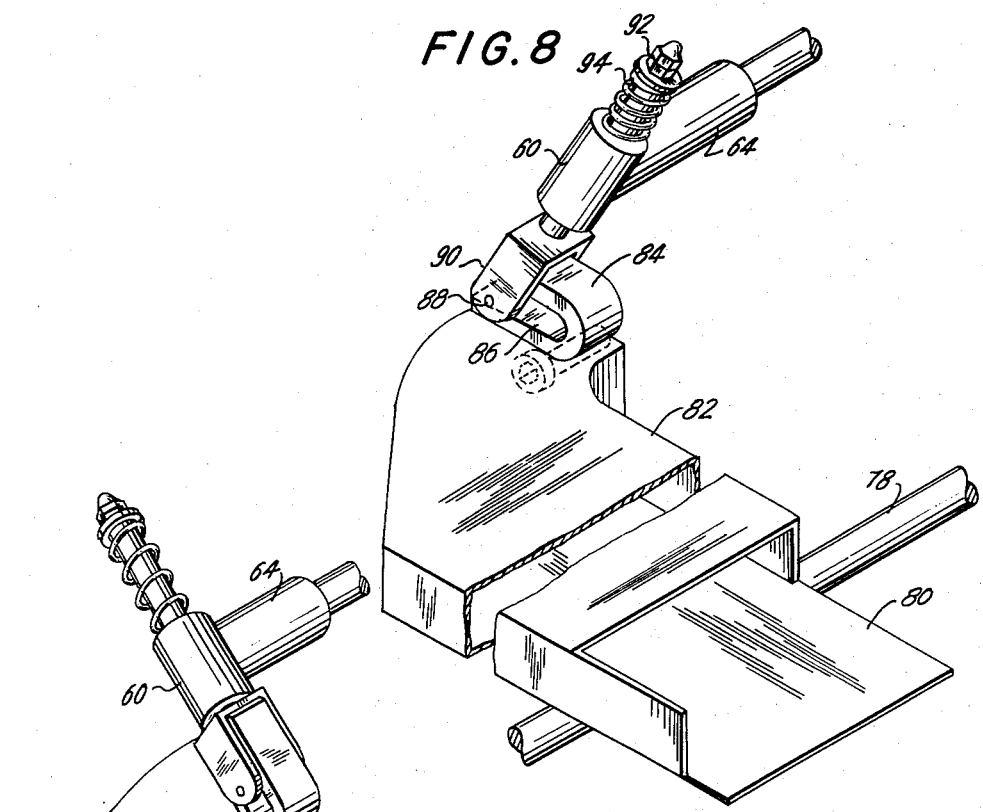

United States Patent Office 3,247,532
Patented Apr. 26, 1966

3,247,532
TRANSFER MECHANISM
Paul W. Klooz, West Hartford, and Edward A. Kelly and Vincent A. Stifano, Jr., Wethersfield, Conn., assignors to Veeder-Root, Incorporated, Hartford, Conn., a corporation of Connecticut
Filed Apr. 27, 1964, Ser. No. 362,746
7 Claims. (Cl. 10—2)

This invention relates to the manufacture of articles having a driver receiving head or recess and, more particularly, to a transfer mechanism for transferring an elongated article from a first station to a second station and which is also capable of transferring the elongated article from the second station to a point of discharge.

The present invention is particularly useful, but is not necessarily limited to a transfer mechanism used in combination with an automatic machine tool capable of machining one end and then the other end of an elongated article.

More particularly, the present invention is useful in the art of manufacturing articles having threaded shanks at one end portion and driver receiving head or recess at the other end.

In the manufacture of headed articles having threaded shank portions and driver receiving recesses in the head at the other end, it is conventional to sever an elongated article from rod stock and to thereafter form a head portion at one end with a driver receiving recess. The head may be enlarged where the finished article is a cap screw, for example, but may have the same diameter as the rod or shank where the finished article is a set screw. Thereafter the ends of the elongated article may be trimmed, chamfered, turned, knurled, shaped or subjected to some other similar machining operation. Such machines are generally referred to as cutting and trimming devices.

Generally speaking, the elongated article is held in a chuck or collet means and one end of the article is subjected to a machining operation such as described above. Thereafter, the elongated article is removed from the first chuck means, turned one hundred and eighty degrees or other angle necessary to turn the article substantially end for end and thereafter placed in the second chuck means so that the other end of the elongated article can be subjected to the machining operation. The elongated article is then removed from the second chuck means and discharged from the device. In the past the transfer steps described above were accomplished in a step-by-step manner by hand but at the present time there are known several prior art devices for accomplishing the result by means of automatic equipment. For example, automatic transfer mechanisms are shown and described in United States Patent 2,881,452, granted on April 14, 1959, and in United States patent application Serial No. 832,990 filed August 11, 1959, now Patent No. 3,150,390. Although the inventions described and claimed in the aforementioned patent and patent application represented substantial advances over the prior art at the time, the present invention represents a further improvement upon these inventions.

Prior devices have been limited in their capacity to handle elongated articles, in the number of pieces which can be transferred per unit of time and have been more complicated than is generally desirable.

Briefly described, the present invention includes a transfer mechanism adapted to co-operate with two work holding means or collets having a transfer finger mounted within a tubular shaft for pivoted movement about an axis intermediate its ends, wherein a gripping means is mounted at one end of the transfer finger to move with the transfer finger along an arcuate path between the first and second chuck means. While the transfer finger is following the arcuate path from the first chuck to the second chuck means are provided so that the transfer finger and the gripping means rotate about its own axis to thereby rotate the article carried thereby 180°. The transfer finger and the gripping means is mounted for movement along the longitudinal axis of the hollow shaft and means are provided for axially moving the gripping means at each end of the arcuate path to a position of alignment with the work holding means.

More specifically, the present invention provides a transfer mechanism which is adapted to transfer an elongated article from a first collet to a second collet means so that opposite ends of the article can be machined and thereafter discharged from the device by a discharge mechanism which operates in timed relation to the transfer mechanism. As embodied, this invention includes a transfer finger adapted for pivotal movement about one axis and adapted for rotational movement about its longitudinal axis. A gripping means is mounted on the transfer finger and is adapted for movement along the longitudinal axis of the hollow shaft for alignment with the collet means. Means in the form of tappets is provided for moving the transfer finger and the gripping means axially along the longitudinal axis of the hollow shaft in timed relation to the position of the finger adjacent the collet means to insure alignment of the elongated article with the collets at the appropriate times. The transfer mechanism is constructed and arranged so that the pivotal movement of the transfer finger and gripping means cause the rotational movement of the transfer finger and gripping means to thereby turn the article end for end. A discharge mechanism is provided which is operated in timed relation to the transfer mechanism and includes a reciprocating or oscillating discharge finger which moves the elongated article away from the machine after the machining operations have been completed. In one embodiment of this invention a new and improved discharge chute is provided in co-operative relationship with the discharge mechanism. The construction and arrangement of elements is such that the location of the pivot point and the length of radii of both the actuating and resulting motions can be accurately regulated.

In view of the foregoing, it is an object of the present invention to provide a new and improved transfer mechanism for transferring a work piece from one position to another position while moving the work piece end for end.

Another object of this invention is to provide a new and improved transfer mechanism for moving an elongated work piece from one work station to another work station.

A still further object of this invention is to provide a new and improved transfer mechanism for turning an elongated article end for end while being transferred from one work station to another work station.

A further object of this invention is to provide a new and improved transfer mechanism for moving an elongated article end for end while being transferred from one work station to another work station which co-operates with a discharge mechanism for removing the elongated article from the second work station after completion of the operation at the second work station.

A still further object of this invention is to provide a new and improved transfer mechanism for positioning opposite ends of an elongated article in a first and second chuck means wherein means are provided for discharging the elongated article from the device in timed relation to the transfer device.

Another object of this invention is to provide a new and improved transfer mechanism for permitting the machining of opposite ends of an article wherein the article is transferred from one work station to another and turned end for end within a zone spaced from the machining tools.

Another object of this invention is to provide a new and improved transfer mechanism for permitting machining of opposite ends of an elongated article wherein the article is removed from the first chuck means after machining of one end of the article, moved to a position or first done away from the machining tools, moved generally towards a second chuck means while being turned end for end, moved to a position of alignment with the second chuck means, positioned in the second chuck means so that the other end of the article can be machined and thereafter removed from the second chuck means and then discharged from the device.

A still further object of this invention is to provide a new and improved transfer device for permitting opposite ends of an elongated article to be machined while held in a first and second chuck means respectively wherein means are provided so that movement of the elongated article from the first to the second chuck means causes the article to be turned end for end.

Additional objects and advantages of the invention will be set forth in the description which follows, and in part will be obvious from the description, or may be learned from practice of the invention, the objects and advantages being realized and attained by means of the instrumentalities and combinations, particularly pointed out in the appended claims.

The accompanying drawings which are incorporated in and constitute a part of this specification, illustrate an embodiment of the invention and together with the description serve to explain the principles of the invention.

Of the drawings:

FIGURE 1B is a front elevation view of a transfer device in accordance with the present invention.

FIGURE 2 is an enlarged view similar to FIGURE 1B showing a step in the operation of a transfer device in accordance with the present invention.

FIGURE 3 is another enlarged view similar to FIGURE 2 showing another step in the operation of the transfer device.

FIGURE 8 is a perspective view showing one position of an embodiment of a discharge chute useable with the present invention.

FIGURE 9 is a perspective view showing another position of the discharge chute shown in FIGURE 8.

Reference is now made to the drawings wherein a preferred embodiment of the present invention is shown and wherein the same reference numeral is used to show the identical parts.

Figure 1A:
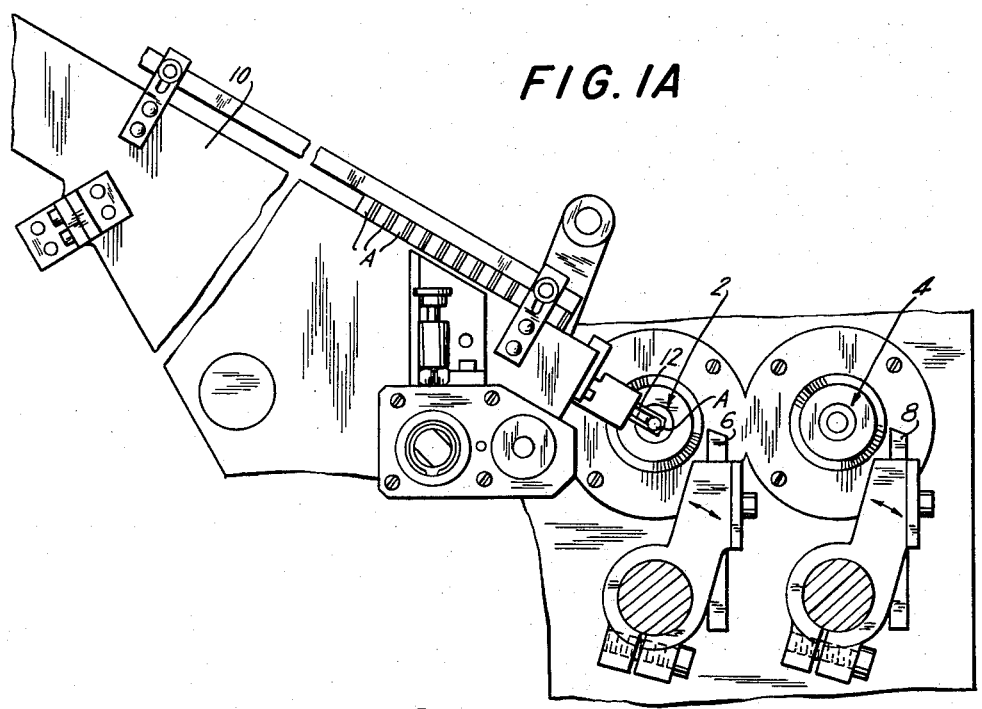
FIGURE 1A is a partial front view of a typical machine with the feeding mechanism with which the present invention may be used.

Referring now to the drawings and particularly FIGURE 1A, a preferred embodiment of the invention is shown which discloses the general operation of the present invention. A general description of the environment for the present invention will be given since it will be generally helpful in understanding some of the advantages of the present invention.

As shown in FIGURE 1A a first chuck means 2 and a second chuck means 4 is provided for holding the elongated article A while the opposite ends of an elongated article A are machined by machining tools 6 and 8 respectively. The details of the machining operation are not an important feature of the present invention but the tools can perform for example, a chamfering, facing, trimming or other similar type of machine operation.

The elongated articles A are fed to the first chuck means 2 in any suitable manner and as disclosed herein the elongated articles are fed between inclined guide rails 10. When an elongated article reaches the bottom of the inclined rails 10 it is transferred by means of the fingers 12 to a position adjacent the first collet means 2 so that it can be held therein. The fingers 12 are constructed and arranged so that the elongated article is moved through an angle of approximately 90° while being moved from between the guide rails to a position of alignment with the first collet means.

The above described mechanism forms no direct part of the present invention and is is described in more detail in application Serial No. 832,990, filed August 11, 1959, now Patent No. 3,150,390.

The transfer mechanism of the present invention is particularly useful where it is necessary to machine the ends of an elongated article. It is to be understood that the present invention is not limited to this particular form and that while the present invention is particularly useful where there is a first and second collet means, the invention is not necessarily limited to this particular number of collet means but is applicable where there are a plurality of collet means.

Moreover, the present invention has utility as a transfer mechanism generally and is not limited to an environment where the elongated article is moved from one collet to another. Thus, for example, the present invention might be used where it was desired to transport a part from the feed rails and re-orient the article prior to its being inserted in the first collet.

As will be apparent to those with ordinary skill in the art, a machining operation is performed on one end of the elongated article A by a machining tool 6 while the article is held in the first collet means 2, the article is then transferred to the second collet means 4 so that the opposite end of the article is directed outwardly and a machining operation is performed on the outwardly directed end of the article by the machining tool 8. The construction and operation of the collet means forms no part of this invention and for a description of a collet means which can be used in the practice of this invention reference is made to U.S. Patent 2,881,452 granted April 14, 1959. Similarly, reference to the foregoing patent and patent application will explain the manner and structure utilized in inserting and removing the elongated article from the collet means. Since these details form no direct part of this invention, a detailed description is not believed to be necessary.

In accordance with this invention means are provided for transferring an elongated article from a first collet means to a second collet means.

As embodied herein (FIGS. 1B, 2 and 3), this means comprises a transfer finger 20 having an article gripping means 22 (shown in FIGURE 7) at one end and a nut element 24 at the other end. The transfer finger 20 is reciprocally mounted for movement back and forth within the tubular shaft 26 and is normally biased upwardly by the spring 28. The spring forces the gripping means to be a position or first zone whereby an article carried thereby is spaced away from the machining tools.

Means is provided in accordance with this invention for mounting the transfer shaft and transfer finger for pivotal movement about a horizontal axis generally parallel to the axis of the collet means so that the gripping end 22 of the transfer finger 20 follows an arcuate path between the first and second collet means. As embodied herein, this means includes a substantially square member 21 to which the tubular shaft 26 is fixedly attached. The square member is attached to a pivotal shaft 32. It is apparent from the foregoing that pivotal movement of the shaft 32 results in pivotal movement of the transfer shaft and the transfer finger so that the gripping means and article carried thereby follow an arcuate path in the first zone while moving from the first to the second collet means.

Means are provided in accordance with this invention for pivoting the transfer finger. This means as embodied herein comprises a cam 34 which engages the bell crank 36, which through connecting rod 38 and lever 72 (FIG. 6), moves the shaft 32 against the action of spring 40 to thereby oscillate the shaft 32. This pivotal movement of the shaft 32 results in moving the transfer finger 20 along a generally arcuate path between the first and second collet means as best shown in FIGURES 2 and 3.

In accordance with this invention, means are provided for turning the article end for end so that opposite ends of the elongated article can be machined after the article has been removed from the first collet and located in the second collet. This means, as disclosed herein, includes a pinion gear 42 which is fixedly attached to the tubular shaft 26. The pinion gear is adapted to mesh with the segment gear 43. It will be understood that as the tubular shaft and transfer finger pivots about the axis of shaft 32, the pinion gear meshes with the segment gear 43 to thereby rotate the tubular shaft and the transfer finger since the tubular shaft and the transfer finger are connected together by conventional means so that these elements can rotate together but move axially with respect to one another. The gearing arrangement is such that for a predetermined oscillation of the drive shaft 32 there is a resultant angular rotation of the pinion gear to thereby rotate the transfer finger 180°. In one embodiment of the invention the gearing arrangement is such that for a 45° oscillation of the draft shaft 32 there is a resultant 180° rotation of the transfer finger and the gripping means, but the invention in its broader aspects is obviously not limited to any particular gearing arrangement. In this manner the outwardly extending end of the elongated article is turned end for end as the article is moved from the first to the second collet means.

In accordance with this invention, means are provided for moving the transfer finger to and from a zone adjacent the collet means and the machining tools. As used herein, the first zone is the zone spaced away from the machining tools where the article moves while following an arcuate path from the first to the second collet means. The second zone is the zone adjacent the machining tools where the article is maintained during the machining operation. More particularly, the present invention includes means for moving the transfer finger and hence the gripping means axially with respect to the tubular shaft in timed relation to the arcuate movement of the transfer finger.

As embodied herein, and shown in FIGS. 1B, 2 and 3, this means includes a pair of tappets 44, 46 which are mounted on the oscillatory shaft 48. The shaft 48 is oscillated by means of the cam 35 which through bell crank follower 50 moves connecting rod 52 against the spring 54 to thereby oscillate the shaft 48. Oscillation of shaft 48 results in an up and down movement of the tappets 44, 46.

It will be understood that the tappet means is constructed and arranged whereby the tappet 44 will engage and thereby lower transfer finger 20 from the first zone to the second zone when the gripping means 22 has been moved along its arcuate path to a position generally adjacent the second collet 4 whereas the tappet 46 will engage and thereby lower the transfer finger when the transfer finger has been moved along its arcuate path to a position generally adjacent the first collet means 2. The action of the tappets 44, 46 will therefore move the gripping means to a position of alignment with the second and first collet means respectively. It will be understood by those skilled in the art that the elongated articles are moved into and out of engagement with the gripping means by pusher rods shown in FIGURE 6, such as described in the aforesaid patent and patent application.

Figure 7:
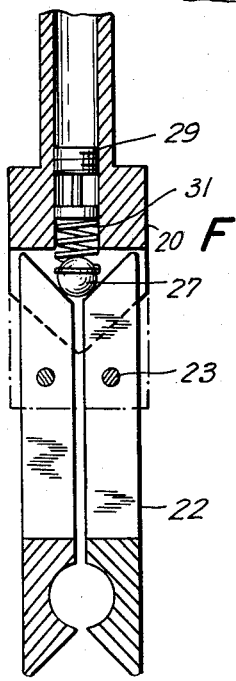
FIGURE 7 is a partial sectional and perspective view showing the gripping means.
Figure 4:
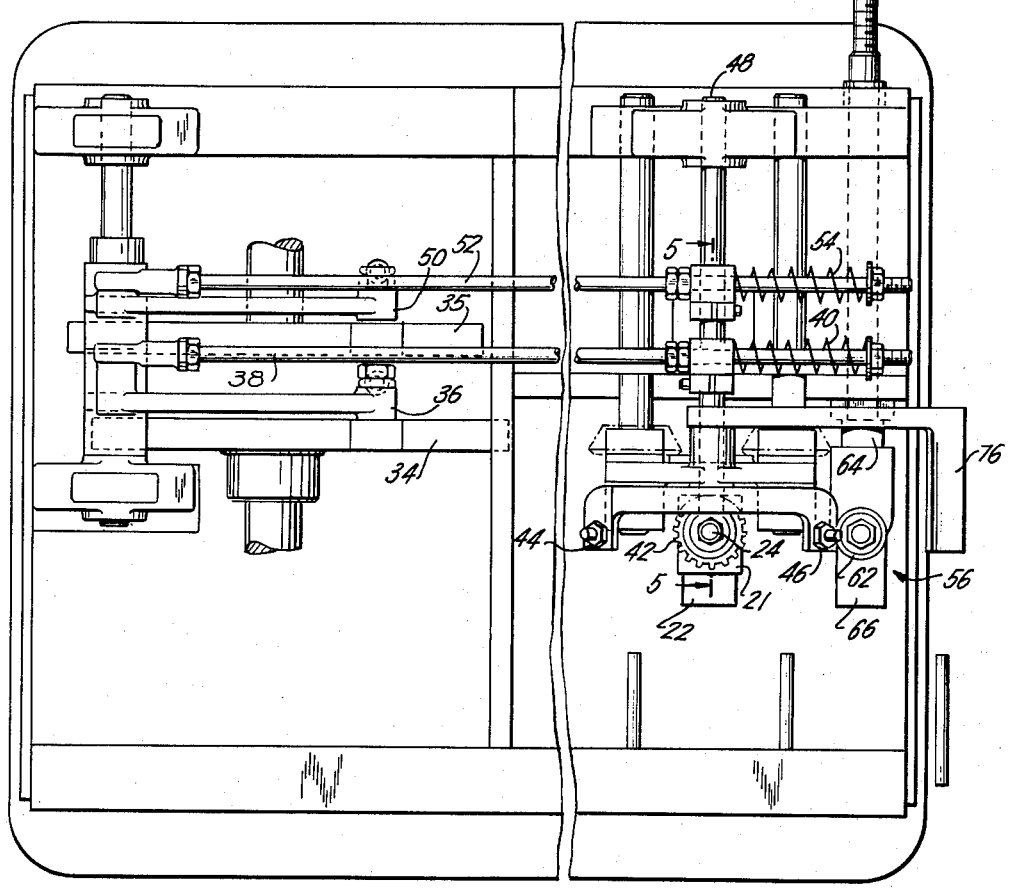
FIGURE 4 is a top plan of the present invention.
Figure 5:
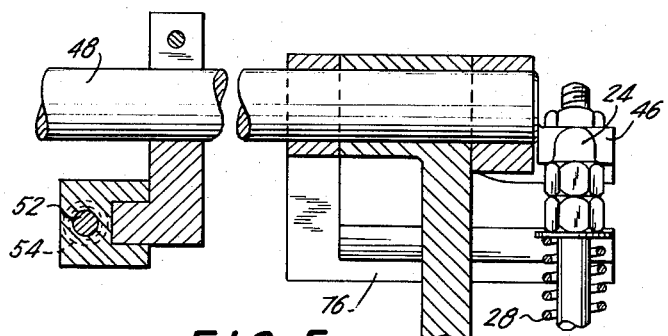
FIGURE 5 is a sectional view taken along line 5—5 of FIGURE 4.

Reference is now made to FIGURE 7 for a description of the gripping means 22. Pivotally mounted by pins 23 on the transfer finger 20 are the gripper elements 22. One end of the gripper element is tapered and a ball 27 is mounted in engagement therewith. A set screw 29 is provided for positioning spring 31 in engagement with the ball 27. It will be understood that the gripping means has a gripping action when it moves into engagement with an elongated article to grip the article firmly as determined by the strength of the spring 31.

In accordance with this invention, the transfer mechanism cooperates with and in part includes a discharge mechanism which discharges the elongated article at the completion of the machining operation in the second collet means in timed relation to the movement of the transfer finger.

Figure 6:
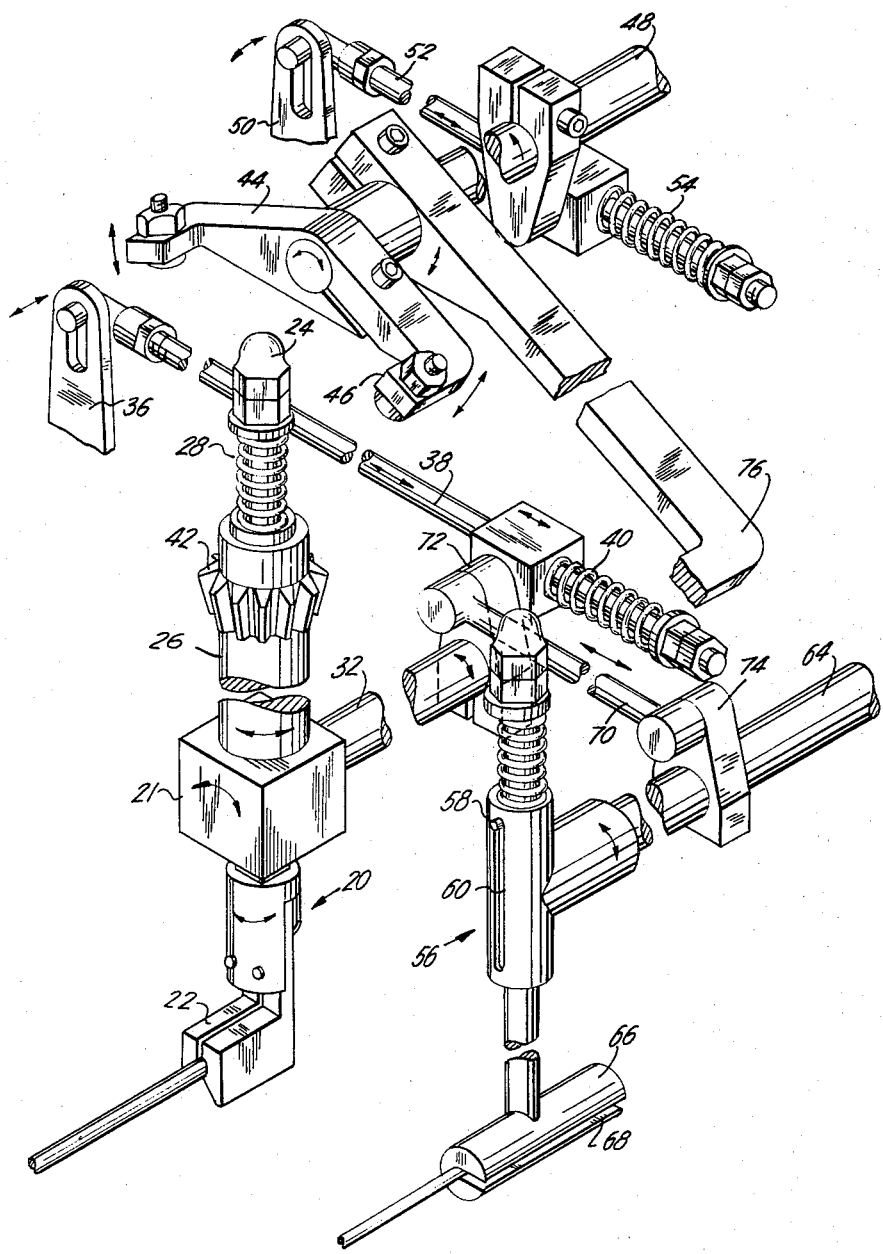
FIGURE 6 is a perspective view showing a portion of the invention.

As embodied herein, and shown specifically in FIGURE 6, this means comprises a discharge finger 56 mounted with a pin 58 and slot 60 connection to hollow shaft 62 which is connected to the drive shaft 64. At one end of the discharge finger 56 is a discharge tube 66 having a longitudinally extending slot 68 therein. Means is provided for moving the discharge finger towards and away from the second collet means in response to the arcuate movement of the transfer finger.

As embodied, this means comprises a connecting linkage between the drive shaft 32 and drive shaft 64. This linkage includes a rod 70 which is pivotally connected to links 72 and 74 attached to the drive shafts 32, 64, respectively. Thus, the transfer finger 20 and discharge finger 56 have a tandem parallel motion and move in the same direction at the same time.

In accordance with the invention, means are provided for moving the discharge finger axially towards and away from the second collet means 4. This means, as embodied, includes a tappet arm 76 which is operatively connected to the tappet drive shaft 48 so that it will move in a downward direction at the same time that the tappet arm 46 moves downwardly; it will be understood that the tappet arm 76 can comprise an integral extension of tappet arm 46 or can be a separate arm which is separately attached to the tappet drive shaft as shown in FIGURES 2 and 6, respectively.

Another embodiment of a discharge mechanism is shown in FIGURES 8 and 9. In this embodiment of the invention, a shaft 78 is pivotally mounted and the bottom 80 of a pan 82 is attached thereto for movement therewith. At one end the pan is provided with a bracket 84 having a slot 86. Mounted in the slot is a roller pin 88 mounted between the legs 90 of a bracket attached to the reciprocal pin 92. The pin 92 is mounted for axial movement, within the hollow member 60 which is attached to shaft 64 in the same manner as described in the description of FIGURE 6.

The pin 92 is moved downwardly by the action of tappet 76 and is moved upwardly by the spring 94. When the tappet 76 moves pin 92 downwardly, the pan 82 is pivoted about the axis of shaft 78 as shown in FIGURES 8–9 to be in position for receiving a machined blank. Upward movement of the pin 92 caused by spring 94 causes tilting of pan 82 to thereby discharge the elongated article from the pan 82.

The shaft 64, it will be understood, moves the pan 82 to a position adjacent the second collet means for receipt of a machined article and then moves the article to a position removed from the second collet means.

Operation

The operation of the device is as follows. After the pickup finger 12 has removed an elongated article from the inclined rails 10 and the article has been machined, a rod (not shown) is operated to eject the article from the collet 2. Prior to the ejection of the article, the tappet 46 has forced the transfer finger downwardly to a position of alignment with the first collet 2 so that the article gripping means can grip the workpiece A. The spring element 28 then moves the article A upwardly to a first zone or position where there will be no interference with the machining tools. After the article has been moved upwardly, the transfer shaft 24 and finger 20 are pivoted by drive shaft 32 so that the article follows an arcuate path about the axis of shaft 32 generally towards the second chuck means 4. While the article is following the arcuate path, the article is turned end for end about its geometric center by means of the gears 42 and 43. When the article reaches the end of its arcuate path, the tappet means 44 engages the nut 24 to thereby move the transfer finger downwardly to position the article in alignment the second collet 4 (see FIG. 3). At this time a rod (not shown) forces the article into the second collet 4 so that the opposite end of the article can be machined by the machine tool 8.

It will be understood that the above described operation is carried out in timed relation by the cam 34 and associated structure.

The transfer finger at this time is returned to the first collet means and the cycle begins again.

At the time that the transfer finger is adjacent the first collet and tappet 46 has aligned the gripping means 22 with the first collet means, the discharge finger 56 has been positioned adjacent the second collet means and moved by means of the tappet 76 to a position of alignment with the second chuck means. A drive rod (not shown) then removes the article from the collet 4 and locates it in the discharge tube. As the transfer finger moves from the first to the second collet, the discharge finger moves outwardly to a position whereby the article in the discharge tube is pushed out by a rod, as shown, into any convenient receptacle.

It will be understood that in lieu of the discharge tube 66 the pan 82 and associated structure (FIGS. 7–8) may be substituted therefor and will have the same sequence of operation as that described above.

It is to be understood that the invention in its broader aspects is not limited to the specific elements shown and described but also includes within the scope of the accompanying claims any departures made from such elements which do not sacrifice its chief advantages.

What is claimed is:

1. A transfer mechanism for elongated articles comprising: a frame, first and second collet means mounted generally parallel to one another, an oscillating drive shaft mounted on said frame generally parallel to said chuck means, a transfer means for transferring an elongated article from said first collet means to said second collet means while rotating said workpiece 180° about an axis intermediate the ends of the article, said transfer means being mounted at one end of said drive shaft, said transfer device including a hollow transfer shaft mounted generally perpendicularly to said drive shaft, a transfer finger connected to said hollow shaft and adapted to rotate with hollow shaft and being movable axially of said hollow shaft, means for moving said transfer shaft and transfer finger through an arc between said first and second chuck means, and means operating in timed relation to the oscillating movement of said hollow transfer shaft and said transfer finger for moving said transfer finger axially with respect to said hollow transfer shaft to thereby align the end of said transfer finger with respect to said first and second collet means.

2. A transfer mechanism as defined in claim 1, wherein a discharge mechanism is provided for movement in timed relation to the transfer finger for moving an elongated article from the second collet means to a point of discharge.

3. A machine as defined in claim 1 wherein the discharge mechanism includes a discharge pan.

4. A machine tool comprising: first and second collet means, first and second machine tools adapted to machine the ends of an elongated article held by said first and second collet means respectively, a transfer finger having a gripping means at one end, means mounting the transfer finger for movement along an arcuate path between the first and second collet means, means responsive to the arcuate movement for moving the gripping means so that an article carried thereby is turned substantially end for end, means for moving the gripping means to and from a zone adjacent the machine tools when the gripping means is adjacent the first and second collet means, discharge means operating in timed relation to the transfer finger for transporting an elongated article from the second collet means to a point of discharge, and tappet means for moving the gripper means axially between a first and second zones spaced from and adjacent to said machining tools respectively when the gripper means has been moved adjacent the first and second collet means.

5. A transfer mechanism adapted for transferring elongated articles from a first position to a second position while turning said article end for end comprising: a frame, first and second collet means mounted on said frame generally parallel to one another, a transfer means for transferring an elongated article from said first collet means to said second collet means while turning said elongated article end for end, said transfer means including a hollow transfer shaft mounted for movement in a plane generally perpendicular to said collets, a transfer finger connected to said hollow shaft and adapted to rotate with said hollow shaft and being movable axially of said hollow shaft, said transfer finger having gripping means at one end thereof, means for moving said transfer shaft and said transfer finger through an arc generally perpendicular to the axis of said collet means and means operating in timed relation to the oscillating movement of said hollow transfer shaft and said transfer finger for moving said transfer finger axially with respect to said hollow transfer shaft at each end of the arc to thereby align the end of said transfer finger with respect to said first and second collet means.

6. A transfer mechanism for elongated articles comprising: a frame, first and second collet means mounted generally parallel to one another, a transfer finger having gripping means at one end thereof mounted on said frame for angular oscillation in a plane perpendicular to the axis of said collet means, means for angularly oscillating said transfer arm between the first and second collet means, means for rotating said transfer arm about its own axis while moving from the first to the second collet means to thereby turn an elongated article end for end and means operable at the end of the oscillation for axially moving said transfer finger to thereby align the gripping means with respect to the first and second collet means.

7. A transfer mechanism for transferring an elongated article from a first collet to a second collet comprising: a frame, first and second collet means mounted on said frame in a horizontal plane, a transfer finger mounted on said frame at a point above and intermediate said collets, said transfer finger having gripping means at one end thereof adapted to receive an elongated article from said first collet means, means for angularly oscillating said transfer finger between said first and second collets, means operating in response to said angular oscillation for rotating said transfer shaft about its own axis so as to turn the elongated article held by said gripping means end for end as it moves from said first to said second collet means, means operable when said gripping means is moved to a position adjacent to said collet means for moving said transfer shaft and said gripping means axially so as to align the elongated article carried by said gripping means with said second collet means.

References Cited by the Examiner
UNITED STATES PATENTS

| | | |
|---|---|---|
| 2,569,705 | 10/1951 | Briggs. |
| 2,881,452 | 4/1959 | Klooz _____ 10—19 |
| 2,998,887 | 9/1961 | Sommer. |
| 3,022,526 | 2/1962 | Davis. |
| 3,165,766 | 1/1965 | Wisebaker _____ 10—166 XR |

MARVIN A. CHAMPION, *Primary Examiner.*